United States Patent
Vong

(10) Patent No.: US 10,275,050 B2
(45) Date of Patent: Apr. 30, 2019

(54) INK FOR A SHARED INTERACTIVE SPACE

(71) Applicant: Microsoft Technology Licensing, LLC, Redmond, WA (US)

(72) Inventor: William H. Vong, Hunts Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 14/665,369

(22) Filed: Mar. 23, 2015

(65) Prior Publication Data

US 2015/0341400 A1 Nov. 26, 2015

Related U.S. Application Data

(60) Provisional application No. 62/002,648, filed on May 23, 2014.

(51) Int. Cl.

| | |
|---|---|
| G06F 3/00 | (2006.01) |
| G06F 3/01 | (2006.01) |
| G06F 3/0354 | (2013.01) |
| G06F 3/038 | (2013.01) |
| H04L 29/06 | (2006.01) |
| G06F 3/0484 | (2013.01) |
| G06T 11/60 | (2006.01) |
| G06T 11/20 | (2006.01) |
| G06F 3/041 | (2006.01) |
| G06F 3/0488 | (2013.01) |

(52) U.S. Cl.
CPC .......... *G06F 3/03545* (2013.01); *G06F 3/013* (2013.01); *G06F 3/038* (2013.01); *G06F 3/041* (2013.01); *G06F 3/04842* (2013.01); *G06F 3/04845* (2013.01); *G06F 3/04883* (2013.01); *G06T 11/203* (2013.01); *G06T 11/60* (2013.01); *H04L 65/403* (2013.01); *G06F 2203/0381* (2013.01); *G06F 2203/04807* (2013.01)

(58) Field of Classification Search
None
See application file for complete search history.

(56) References Cited

U.S. PATENT DOCUMENTS

| | | | |
|---|---|---|---|
| 5,559,942 | A | 9/1996 | Gough et al. |
| 5,613,019 | A | 3/1997 | Altman et al. |
| 6,498,601 | B1 | 12/2002 | Gujar et al. |
| 6,675,352 | B1 | 1/2004 | Osaki et al. |

(Continued)

OTHER PUBLICATIONS

"Non-Final Office Action", U.S. Appl. No. 14/665,462, dated Sep. 20, 2016, 10 pages.

(Continued)

*Primary Examiner* — Toan H Vu

(57) ABSTRACT

Techniques for ink for a shared interactive space are described. According to various embodiments, a shared interactive space is presented on devices for different users that are participating in a communication session with one another. Ink content applied by a particular user to an instance of the shared interactive space is propagated to other instances of the shared interactive space. According to various implementations, a shared interactive space is invocable in different ways. For instance, different user-initiated invoke events can cause a shared interactive space to be presented, such as while a communication session is in progress.

20 Claims, 14 Drawing Sheets

(56) References Cited

U.S. PATENT DOCUMENTS

| | | | |
|---|---|---|---|
| 7,286,141 B2 | 10/2007 | Rieffel et al. | |
| 7,825,922 B2 | 11/2010 | Keely et al. | |
| 8,004,498 B1 | 8/2011 | Meridian | |
| 8,181,103 B2 | 5/2012 | Lin et al. | |
| 8,402,391 B1* | 3/2013 | Doray | G06F 3/0482 715/834 |
| 9,285,903 B1 | 3/2016 | Yun et al. | |
| 9,323,807 B2 | 4/2016 | Werner et al. | |
| 2002/0024499 A1 | 2/2002 | Karidis | |
| 2003/0214536 A1 | 11/2003 | Jarrett et al. | |
| 2004/0017375 A1 | 1/2004 | Lui et al. | |
| 2004/0257346 A1* | 12/2004 | Ong | G06F 3/03545 345/179 |
| 2005/0244058 A1 | 11/2005 | Gorbatov et al. | |
| 2006/0018546 A1 | 1/2006 | Lagardere et al. | |
| 2006/0212813 A1 | 9/2006 | Yalovsky et al. | |
| 2006/0215886 A1 | 9/2006 | Black | |
| 2006/0267967 A1 | 11/2006 | Hinckley et al. | |
| 2007/0046649 A1 | 3/2007 | Reiner | |
| 2007/0109281 A1 | 5/2007 | Simmons et al. | |
| 2008/0165162 A1 | 7/2008 | Zloter et al. | |
| 2009/0000831 A1 | 1/2009 | Miller et al. | |
| 2009/0027400 A1 | 1/2009 | Marggraff et al. | |
| 2009/0231275 A1 | 9/2009 | Odgers | |
| 2009/0327501 A1 | 12/2009 | Athsani et al. | |
| 2010/0299616 A1* | 11/2010 | Chen | G06Q 10/10 715/753 |
| 2011/0018963 A1* | 1/2011 | Robinson | G06Q 10/00 348/14.16 |
| 2011/0143769 A1 | 6/2011 | Jones et al. | |
| 2011/0166777 A1 | 7/2011 | Chavakula | |
| 2011/0172902 A1 | 7/2011 | McBride et al. | |
| 2011/0184282 A1 | 7/2011 | Tockman | |
| 2011/0184828 A1 | 7/2011 | Siegel et al. | |
| 2011/0185300 A1 | 7/2011 | Hinckley et al. | |
| 2011/0307783 A1 | 12/2011 | Robert et al. | |
| 2012/0159351 A1 | 6/2012 | Bell et al. | |
| 2013/0024785 A1* | 1/2013 | Van Wie | G06F 3/04815 715/753 |
| 2013/0036356 A1* | 2/2013 | Worrill | H04N 7/181 715/719 |
| 2013/0086487 A1* | 4/2013 | Findlay | H04N 7/15 715/753 |
| 2013/0205189 A1 | 8/2013 | DiPierro et al. | |
| 2013/0257777 A1* | 10/2013 | Benko | G06F 3/03545 345/173 |
| 2013/0290863 A1* | 10/2013 | Chen | G06F 3/0481 715/747 |
| 2014/0019883 A1* | 1/2014 | Tandon | H04N 7/152 715/756 |
| 2014/0026076 A1* | 1/2014 | Jacob | G06F 3/0418 715/757 |
| 2014/0047330 A1* | 2/2014 | Yan | G06F 3/0486 715/273 |
| 2014/0055399 A1 | 2/2014 | Lee et al. | |
| 2014/0136985 A1* | 5/2014 | Albir | H04W 4/003 715/748 |
| 2014/0143672 A1* | 5/2014 | Kim | G06F 17/30861 715/733 |
| 2014/0168096 A1 | 6/2014 | Bathiche et al. | |
| 2014/0191983 A1 | 7/2014 | Choi et al. | |
| 2014/0258901 A1 | 9/2014 | Cho | |
| 2014/0267062 A1* | 9/2014 | Nakao | G06F 3/03545 345/173 |
| 2014/0267081 A1* | 9/2014 | Kreek | G06F 3/041 345/173 |
| 2014/0282103 A1* | 9/2014 | Crandall | H04L 65/403 715/753 |
| 2014/0328505 A1* | 11/2014 | Heinemann | H04S 7/303 381/303 |
| 2015/0009154 A1 | 1/2015 | Shih et al. | |
| 2015/0032686 A1* | 1/2015 | Kuchoor | G06F 17/241 707/608 |
| 2015/0052200 A1* | 2/2015 | Ouyang | H04L 12/1813 709/204 |
| 2015/0052430 A1* | 2/2015 | Dwan | G06F 3/04883 715/702 |
| 2015/0067483 A1 | 3/2015 | Demiya et al. | |
| 2015/0100876 A1 | 4/2015 | Neugebauer et al. | |
| 2015/0127681 A1 | 5/2015 | Lee et al. | |
| 2015/0177954 A1* | 6/2015 | Wei | G06F 3/0482 715/738 |
| 2015/0261378 A1 | 9/2015 | Lee et al. | |
| 2015/0286810 A1 | 10/2015 | Lebert | |
| 2015/0288633 A1* | 10/2015 | Ogundokun | H04L 51/12 709/206 |
| 2015/0304376 A1* | 10/2015 | Gottlieb | H04L 65/4038 715/719 |
| 2015/0319197 A1* | 11/2015 | Capt | H04L 65/403 709/203 |
| 2015/0338938 A1 | 11/2015 | Vong | |
| 2015/0338939 A1 | 11/2015 | Vong | |
| 2015/0338940 A1 | 11/2015 | Vong | |
| 2015/0339050 A1 | 11/2015 | Vong | |
| 2015/0341400 A1 | 11/2015 | Vong | |
| 2016/0139878 A1* | 5/2016 | Van Wie | G06F 3/167 715/728 |

OTHER PUBLICATIONS

"Non-Final Office Action", U.S. Appl. No. 14/665,413, dated Oct. 21, 2016, 10 pages.

"Non-Final Office Action", U.S. Appl. No. 14/665,282, dated Aug. 12, 2016, 11 pages.

"Non-Final Office Action", U.S. Appl. No. 14/665,330, dated Sep. 12, 2016, 12 pages.

"Adobe Illustrator Help and Tutuorials", Adobe, Jan. 2014, 545 pages.

"Writing Surfaces for Digital Ink", Retrieved From: <http://msdn.microsoft.com/en-us/library/ms701170(v=vs.85).aspx> May 28, 2014, Feb. 8, 2011, 3 Pages.

Bartram,"Off the Desktop: Pen and Touch Advanced HCI", Available at: <http://www.sfu.ca/siatclass/IAT351/Fall2012/Lectures/IAT351-Week11-Lecture1.pdf>, Nov. 14, 2012, 91 pages.

Everitt,"Two Worlds Apart: Bridging the Gap Between Physical and Virtual Media for Distributed Design Collaboration", In Proceedings: Conference on Human Factors in Computing Systems, vol. 5, Issue 1, Apr. 5, 2003, 8 pages.

Meghana-rao,"Mixing Stylus and Touch Input on Windows* 8", Retrieved From: <https://software.intel.com/en-us/articles/mixing-stylus-and-touch-input-on-windows-8#capture> Aug. 1, 2014, Sep. 6, 2013, 7 Pages.

Zack,"Microsoft's Office Touch UI and Pen UX Concepts Revealed (Updated)", Retrieved From: <http://www.microsoftproductreviews.com/apps-games/microsofts-office-touch-ui-pen-ux-concepts-revealed/>, May 17, 2014, 35 Pages.

"Final Office Action", U.S. Appl. No. 14/665,413, dated May 3, 2017, 10 pages.

"Final Office Action", U.S. Appl. No. 14/665,462, dated Apr. 20, 2017, 11 pages.

"Final Office Action", U.S. Appl. No. 14/665,282, dated Apr. 20, 2017, 12 pages.

"Final Office Action", U.S. Appl. No. 14/665,330, dated May 3, 2017, 12 pages.

"Non-Final Office Action Issued in U.S. Appl. No. 14/665,282", dated Aug. 25, 2017, 10 Pages.

"Non-Final Office Action Issued in U.S. Appl. No. 14/665,462", dated Sep. 25, 2017, 11 Pages.

"Non-Final Office Action Issued in U.S. Appl. No. 14/665,330", dated Oct. 26, 2017, 12 Pages.

"Non-Final Office Action Issued in U.S. Appl. No. 14/665,413", dated Nov. 30, 2017, 11 Pages.

"Final Office Action Issued in U.S. Appl. No. 14/665,330", dated May 31, 2018, 11 Pages.

"Final Office Action Issued in U.S. Appl. No. 14/665,413", dated Jun. 1, 2018, 13 Pages.

(56) References Cited

OTHER PUBLICATIONS

"Final Office Action Issued in U.S. Appl. No. 14/665,462", dated Apr. 5, 2018, 13 Pages.
"Non Final Office Action Issued in U.S. Appl. No. 14/665,413", dated Oct. 3, 2018, 11 Pages.
"Non Final Office Action Issued in U.S. Appl. No. 14/665,462", dated Sep. 7, 2018, 14 Pages.
"Final Office Action Issued in U.S. Appl. No. 14/665,462", dated Jan. 29, 2019, 14 Pages.
"Final Office Action Issued in U.S. Appl. No. 14/665,413", dated Jan. 30, 2019, 11 Pages.

* cited by examiner

INK FOR A SHARED INTERACTIVE SPACE

RELATED APPLICATION

This application claims priority under 35 U.S.C. § 119(e) to U.S. Provisional Patent Application No. 62/002,648, filed May 23, 2014 and titled "Ink," the entire disclosure of which is incorporated by reference in its entirety.

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to a touch-sensing functionality such as a touchscreen, which is interpreted as digital ink. The freehand input may be converted to a corresponding visual representation on a display, such as for taking notes, for creating and editing an electronic document, and so forth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for ink for a shared interactive space are described. According to various embodiments, a shared interactive space is presented on devices for different users that are participating in a communication session with one another. Ink content applied by a particular user to an instance of the shared interactive space is propagated to other instances of the shared interactive space. According to various implementations, a shared interactive space is invocable in different ways. For instance, different user-initiated invoke events can cause a shared interactive space to be presented, such as while a communication session is in progress.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
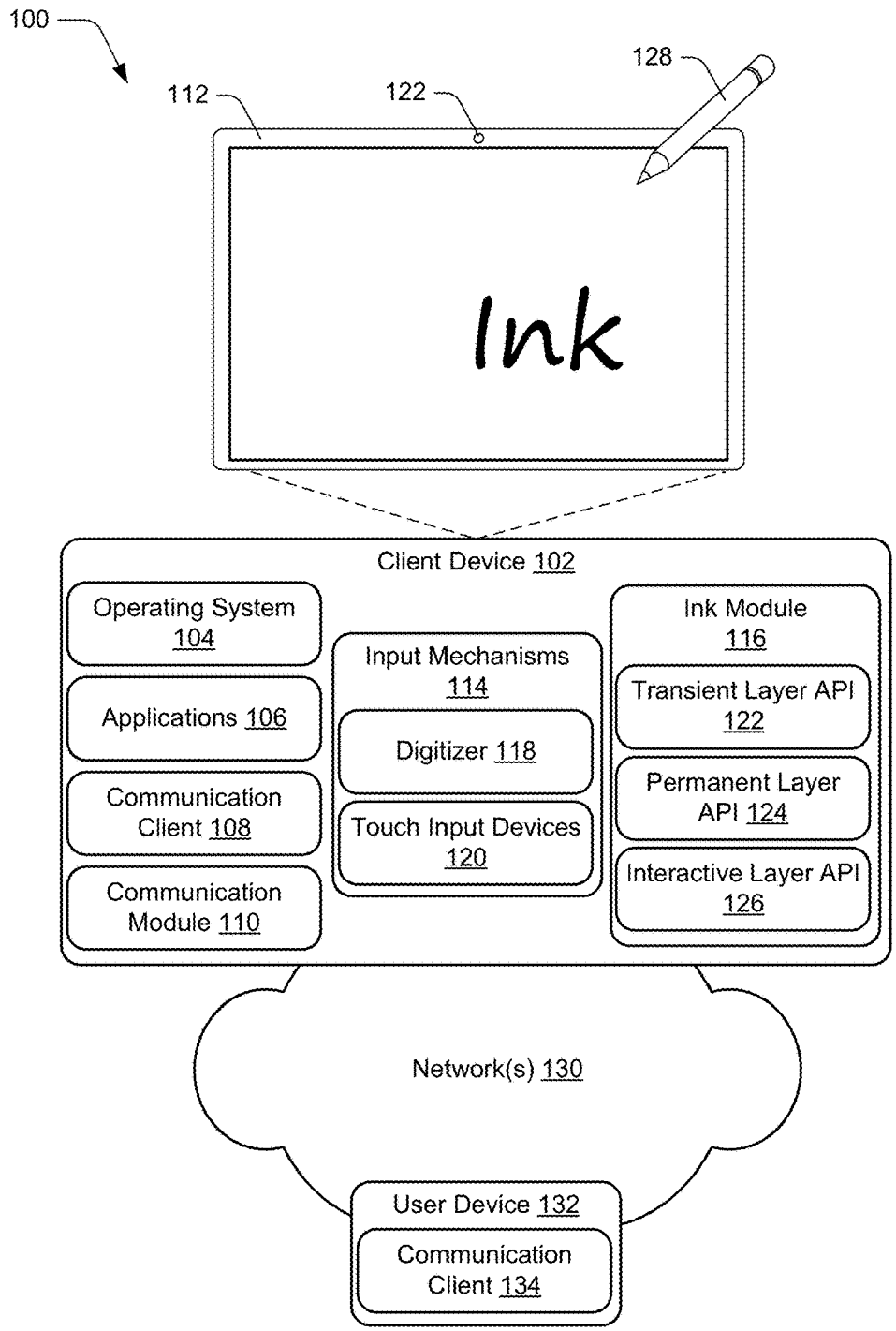
FIG. 1 is an illustration of an environment in an example implementation that is operable to employ techniques discussed herein in accordance with one or more embodiments.

Techniques for ink for a shared interactive space are described. Generally, ink refers to freehand input to a pressure-sensing functionality such as a touchscreen and/or digitizer screen, which is interpreted as digital ink, referred to herein as "ink." Ink may be provided in various ways, such as using a pen (e.g., an active pen, a passive pen, and so forth), a stylus, a finger, and so forth.

According to various implementations, a shared interactive space is presented on devices for different users that are participating in a communication session with one another. The shared interactive space represents a digital canvas on which the users may apply ink content. Ink content applied by a particular user to an instance of the shared interactive space is propagated to other instances of the shared interactive space, e.g., in real-time.

According to various implementations, a shared interactive space is invocable in different ways. For instance, consider a scenario where users at different locations are participating in a communication session with one another. As part of the communication session, a communications graphical user interface (GUI) is presented on devices for the different users. To invoke a shared interactive space, a particular user may interact with the communications GUI and/or a separate input surface. For instance, the user may bring a pen (e.g., an active pen) in proximity to a display on which the communications GUI is displayed and/or a separate associated input surface. Alternatively or additionally, the user may change their gaze direction, e.g., a portion of the display towards which the user is gazing. Generally, different "invoke events" cause a shared interactive space to be presented to users engaged in a communication session such that the users may interact with the shared interactive space.

Accordingly, techniques for ink for a shared interactive space discussed herein improve on current user interaction techniques in various ways. For instance, by recognizing various user cues (e.g., pen proximity, gaze direction, and so forth), techniques discussed herein reduce a number of interactions required to invoke and disengage from a shared interactive space. Further, when a shared interactive space is invoked or disengaged, various visual reconfigurations of a communications GUI enable users to maintain visual interaction with other users engaged in a communication session.

In the following discussion, an example environment is first described that is operable to employ techniques described herein. Next, a section entitled "Example Implementation Scenarios and Procedures" describes some example implementation scenarios and methods for ink for a shared interactive space in accordance with one or more implementations. Finally, a section entitled "Example System and Device" describes an example system and device that are operable to employ techniques discussed herein in accordance with one or more implementations.

Example Environment

FIG. 1 is an illustration of an environment 100 in an example implementation that is operable to employ techniques for ink for a shared interactive space discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in FIG. 14.

The client device 102 includes a variety of different functionalities that enable various activities and tasks to be performed. For instance, the client device 102 includes an operating system 104, applications 106, a communication client 108, and a communication module 110. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 represents functionalities for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication client 108 is representative of functionality to enable different forms of communication via the client device 102. Examples of the communication client 108 include a voice communication application (e.g., a VoIP client), a video communication application, a messaging application, a content sharing application, a unified communication & collaboration (UC&C) application, and combinations thereof. The communication client 108, for instance, enables different communication modalities to be combined to provide diverse communication scenarios.

The communication module 110 is representative of functionality for enabling the client device 102 to communicate over wired and/or wireless connections. For instance, the communication module 110 represents hardware and logic for communication via a variety of different wired and/or wireless technologies and protocols.

The client device 102 further includes a display device 112, input mechanisms 114, and an ink module 116. The display device 112 generally represents functionality for visual output for the client device 102. Additionally, the display device 112 represents functionality for receiving various types of input, such as touch input, pen input, and so forth. The input mechanisms 114 represent different functionalities for providing input to the client device 102, and include a digitizer 118, touch input devices 120, and a camera 122.

The display device 112 includes a camera 122 which is representative of functionality for capture and record visual images, such as still images, video, and so on. The camera 104 includes various image capture components, such as apertures, lenses, mirrors, prisms, electronic image sensors, and so on.

The input mechanisms 114 generally represent different functionalities for receiving input to the client device 102. Examples of the input mechanisms 114 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 114 may be separate or integral with the display 110; integral examples include gesture-sensitive displays with integrated touch-sensitive or motion-sensitive sensors. The digitizer 118 represents functionality for converting various types of input to the display device 112 and the touch input devices 120 into digital data that can be used by the client device 102 in various ways, such as for generating digital ink.

According to various implementations, the ink module 116 represents functionality for performing various aspects of techniques for ink for a shared interactive space discussed herein. Various functionalities of the ink module 116 are discussed below. The ink module 116 includes a transient layer application programming interface (API) 122, a permanent layer API 124, and an interactive layer API 126. The transient layer API 122 represents functionality for enabling interaction with a transient ink layer, and the permanent layer API 124 represents functionality for enabling ink interaction with a permanent object (e.g., document) layer. In at least some implementations, the transient layer API 122 and the permanent layer API 124 may be utilized (e.g., by the applications 106) to access transient ink functionality and permanent ink functionality, respectively.

The interactive layer API 126 represents functionality for enabling techniques for ink for a shared interactive space discussed herein. For instance, the interactive layer API 126 enables a shared interactive surface to be invoked such that users apply ink (permanent ink and/or transient ink) to the shared interactive surface. In at least some implementations, the shared interactive surface is presented as part of a communication session implemented by the communication client 108.

The environment 100 further includes a pen 128, which is representative of an input device for providing input to the display device 112 and/or others of the touch input devices 120. Generally, the pen 128 is in a form factor of a traditional pen but includes functionality for interacting with the display device 112 and other functionality of the client device 102. In at least some implementations, the pen 128 is an active pen that includes electronic components for interacting with the client device 102. The pen 128, for instance, includes a battery that can provide power to internal components of the pen 128.

Alternatively or additionally, the pen 128 may include a magnet or other functionality that supports hover detection over the display device 112. This is not intended to be limiting, however, and in at least some implementations the pen 128 may be passive, e.g., a stylus without internal electronics. Generally, the pen 128 is representative of an input device that can provide input that can be differentiated from other types of input by the client device 102. For instance, the digitizer 118 is configured to differentiate between input provided via the pen 128, and input provided by a different input mechanism such as a user's finger, a stylus, and so forth.

The client device 102 is connected to a network 130 via a wired and/or wireless connection. For instance, the client device 102 communicates with other devices and entities via connectivity to the network 130. Generally, the network 130 is representative of a single network or a combination of different interconnected networks. The network 130, for example, represents a combination of wireless and wired networks and may be configured in a variety of ways, such as a wide area network (WAN), a local area network (LAN), the Internet, and so forth.

Further to the environment 100, the network 130 provides connectivity between the client device 102 and a user device 132. Generally, the user device 132 is representative of an end-user device with which the client device 102 may communicate. The user device 132 includes a communication client 134, which is representative of functionality to enable different forms of communication via the user device 132. In at least some implementations, the communication client 134 represents a different instance of the communication client 108 of the client device 102. Communication between the client device 102 and the user device 132 may include interaction between the communication client 108 and the communication client 134.

Having described an example environment in which the techniques described herein may operate, consider now a discussion of an example implementation scenario in accordance with one or more implementations.

Transient Ink and Permanent Ink

According to various implementations, ink can be applied in different ink modes including a transient ink mode and a permanent ink mode. Generally, transient ink refers to ink that is temporary and that can be used for various purposes, such as invoking particular actions, annotating a document, and so forth. For instance, in transient implementations, ink can be used for annotation layers for electronic documents, temporary visual emphasis, text recognition, invoking various commands and functionalities, and so forth.

Permanent ink generally refers to implementations where ink becomes a part of the underlying object, such as for creating a document, writing on a document (e.g., for annotation and/or editing), applying ink to graphics, and so forth. Permanent ink, for example, can be considered as a graphics object, such as for note taking, for creating visual content, and so forth.

In at least some implementations, a pen (e.g., the pen 128) applies ink whenever the pen is in contact with an input surface, such as the display device 112 and/or other input surface. Further, a pen can apply ink across many different applications, platforms, and services. In one or more implementations, an application and/or service can specify how ink is used in relation to an underlying object, such as a word processing document, a spreadsheet and so forth. For instance, in some scenarios ink is applied as transient ink, and other scenarios ink is applied as permanent ink. Examples of different implementations and attributes of transient ink and permanent ink are detailed below.

Example Implementation Scenarios and Procedures

This section describes some example implementation scenarios and example procedures for ink for a shared interactive space in accordance with one or more implementations. The implementation scenarios and procedures may be implemented in the environment 100 described above, the system 1400 of FIG. 14, and/or any other suitable environment. The implementation scenarios and procedures, for example, describe example operations of the client device 102 and/or the user device 132. While the implementation scenarios and procedures are discussed with reference to a particular application, it is to be appreciated that techniques for ink for a shared interactive space discussed herein are applicable across a variety of different applications, services, and environments. In at least some implementations, steps described for the various procedures are implemented automatically and independent of user interaction.

Figure 2:
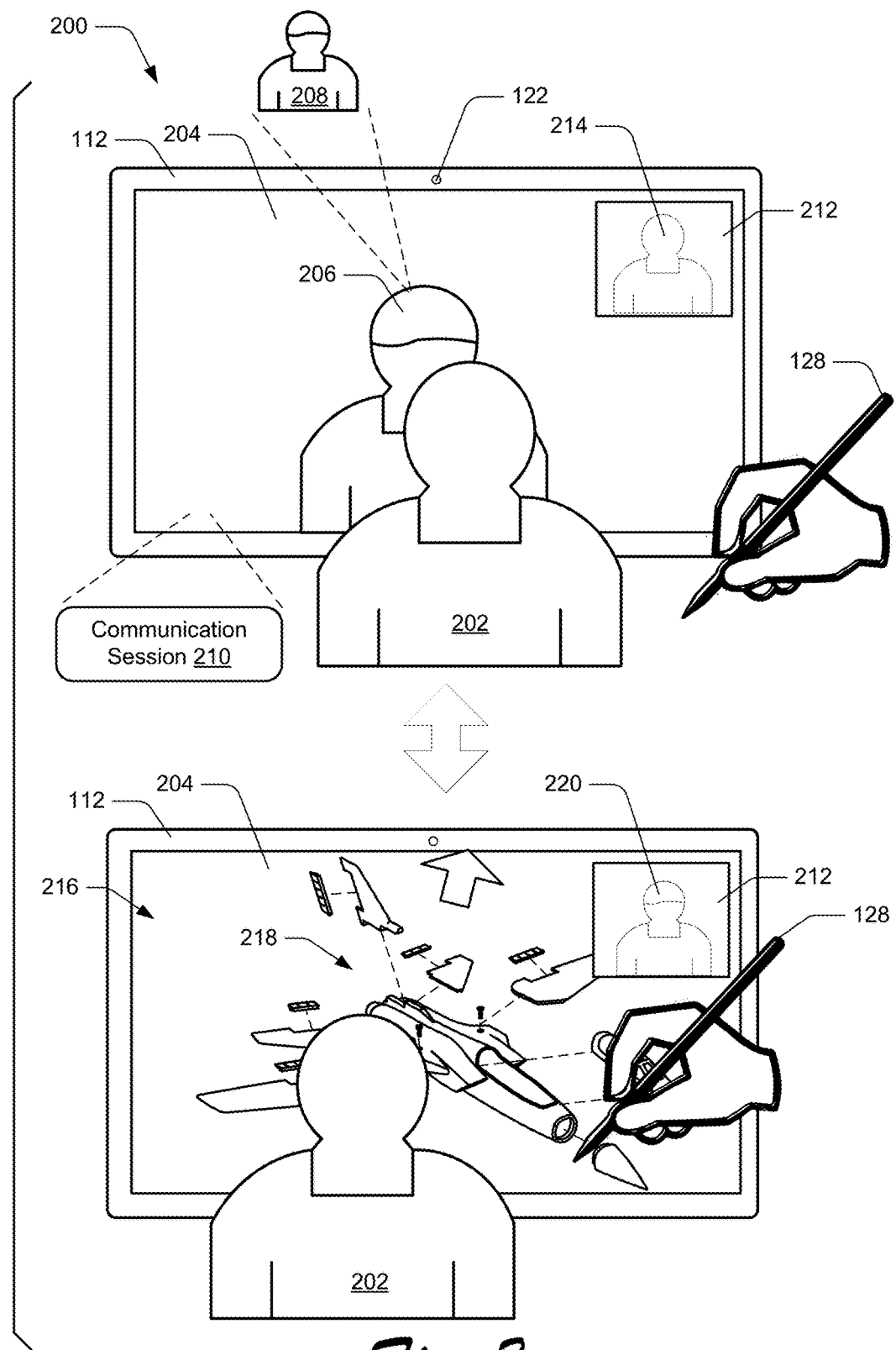
FIG. 2 depicts an example implementation scenario for an interactive ink mode in accordance with one or more embodiments.

FIG. 2 depicts an example implementation scenario 200 for an interactive ink mode in accordance with one or more implementations. The upper portion of the scenario 200 includes the display device 112 and a user 202 viewing the display device 112. The user 202, for instance, represents a user of the client device 102.

Displayed on the display device 112 is a communications graphical user interface (GUI) 204, which represents a GUI for the communication client 108. Included in the communications GUI 204 is a user image 206, which represents an image of a user 208 with which the user 202 is communicating as part of a communication session 210. For instance, the user 208 is located remotely from the user 202, and the scenario 200 represents a scenario in which the user 202 is communicating with the user 208 via the communication session 210, such as part of a real-time audio and video communication session. The communications GUI 204, for example, presents the user image 206 as a live video image of the user 208. Further, audio signal from the user 208 is communicated for output to the user 202, and vice-versa. Generally, the communication session 210 represents an exchange of different communication media between the client device 102 and the user device 132, such as audio, video, files, media content, and/or combinations thereof.

The communications GUI 204 further includes a sub-window 212 in which various images and/or information can be displayed. In this particular implementation, the sub-window 212 displays a user image 214 of the user 202 as captured by the camera 122. For instance, the user image 214 duplicates (e.g., in a reduced size) a visual representation of the user 202 as presented in a communications GUI viewed by the user 208 at the user device 132, discussed above with reference to the environment 100.

In the lower portion of the scenario 200, the user 202 places the pen 128 in proximity to the surface of the display device 112. The pen 128, for instance, is placed within a particular distance of the display device 112 (e.g., less than 2 centimeters) but not in contact with the display device 112. This behavior is generally referred to herein as "hovering" the pen 128. In response to detecting hovering of the pen 128 and/or contact of the pen 128 with the display device 112, a shared interactive space 216 is presented in the communications GUI 204. The user image 206, for example, is replaced with the shared interactive space 216. Alternatively, and as detailed below, the user image 206 may be visually deemphasized in the communications GUI 204. Generally, the shared interactive space 216 represents a portion of the communications GUI 204 in which the users 202, 208 can interact, such as to share content. For instance, and as detailed further below, the users 202, 208 can apply ink to the shared interactive space 216. Further, ink applied to the shared interactive space 216 is viewable by both users 202, 208 simultaneously and/or concurrently.

In this particular example, the shared interactive space 216 includes an interactive object 218. The interactive object 218 represents a visual object that is displayed to both the users 202, 208. Further, both of the users 202, 208 may interact with interactive object 218 to manipulate, edit, and annotate the interactive object 218, such as concurrently and/or alternatively.

Further depicted in the lower portion of the scenario 200 is that responsive to the shared interactive space 216 being presented, a user image 220 of the user 208 is displayed within the sub-window 212. The user image 220, for instance, represents a version of the user image 206 that is reduced in size to fit into the sub-window 212. The user image 220 replaces the user image 214 in the sub-window 212 such that the user 202 may continue to view the user 208 while the shared interactive space 216 is displayed.

According to various implementations, if the user removes the pen 128 from proximity to the display device 112, the shared interactive space 216 is removed from display or visually deemphasized. For instance, returning to the upper portion of the scenario 200, the user 202 removes the pen 128 from proximity to the display device 112. In response to the pen 128 being removed from proximity to the display device 112, the shared interactive space 216 is removed from display or visually deemphasized. Further, the user image 220 is replaced with the user image 214.

Thus, the scenario 200 illustrates an implementation where the shared interactive space 216 is activated in response to detecting proximity of the pen 128 to the display device 112, and is deactivated in response to detecting that the pen 128 is removed from proximity to the display device 112. In at least some implementations, detection of the pen 128 in proximity to any arbitrary location of the display device 112 invokes the shared interactive space 216. For instance, presentation of the shared interactive space 216 is not limited to detecting the pen 128 in proximity to a specific region of the display device 112.

Figure 3:
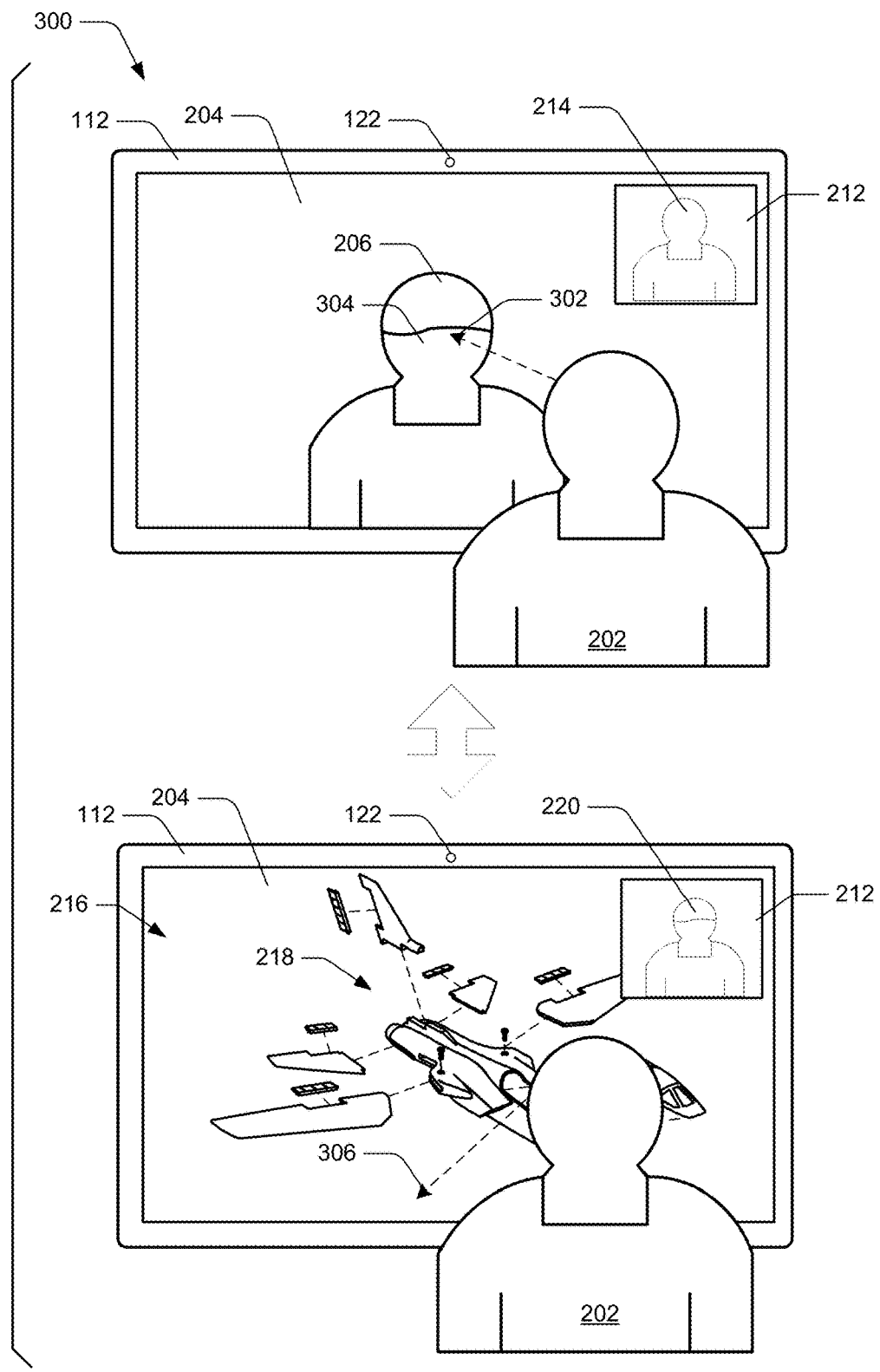
FIG. 3 depicts an example implementation scenario for an interactive ink mode in accordance with one or more embodiments.

FIG. 3 depicts an example implementation scenario 300 for an interactive ink mode in accordance with one or more implementations. In at least some implementations, the scenario 300 represents a continuation and/or variation of the scenario 200. The upper portion of the scenario 300 includes the display device 112 and the user 202 viewing the display device 112. Further, the user 202 is engaged in the communication session 210 with the user 208, introduced above.

In the upper portion of the scenario 300, the client device 102 detects a gaze direction 302 which indicates that the user 202 is looking at the user image 206, such as in the direction of a face 304 of the user image 206. The gaze direction 302, for example, is detected via video signal of the user 202 captured by the camera 122. According to one or more implementations, the gaze direction 302 is detected via any suitable technique for gaze detection.

Proceeding to the lower portion of the scenario 300, the user shifts their gaze toward a lower region of the communications GUI 204 and the client device 102 detects a change from the gaze direction 302 to a gaze direction 306. In response to the change to the gaze direction 306, the shared interactive space 216 is presented with the interactive object 218. In at least some implementations, gaze detected in various regions of the display device 112 causes different functionalities to be implemented. For instance, the gaze direction 302 is interpreted by the client device 102 that the user 202 is interacting with the user 208 and thus the user image 206 is displayed. However, the gaze direction 306 is interpreted by the client device 102 as an intent by the user 202 to invoke the shared interactive space 216, and thus the shared interactive space 216 is displayed. As further detailed elsewhere herein, the user 202 may interact with the shared interactive space 216, such as to apply ink within the shared interactive space 216.

Notice that when the shared interactive space 216 is invoked, the user image 220 replaces the user image 214 in the sub-window 212 such that the user 202 may continue to view the user 208 while the shared interactive space 216 is displayed.

Figure 4:
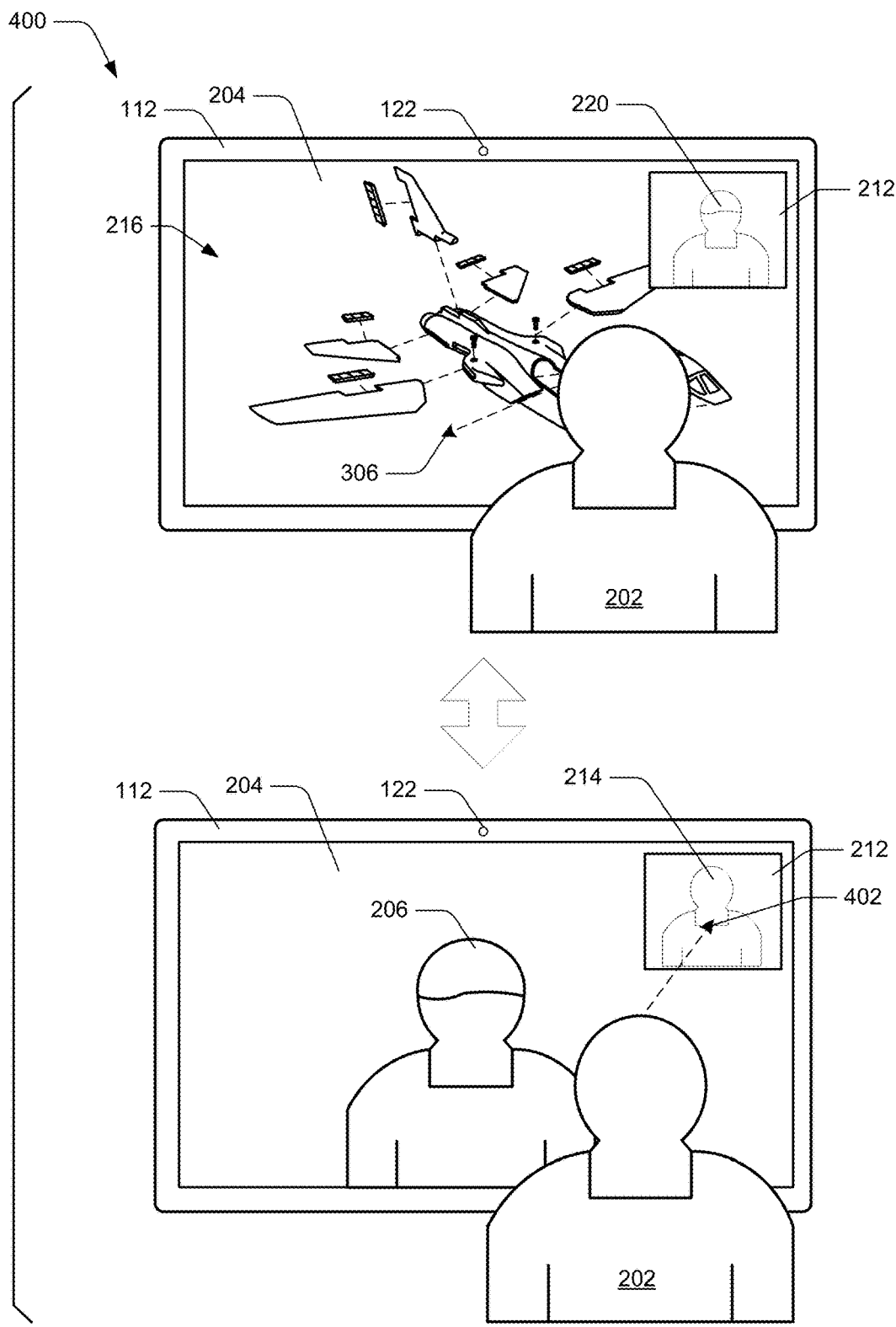
FIG. 4 depicts an example implementation scenario for an interactive ink mode in accordance with one or more embodiments.

FIG. 4 depicts an example implementation scenario 400 for an interactive ink mode in accordance with one or more implementations. In at least some implementations, the scenario 400 represents a continuation and/or variation of the scenarios 200, 300. The upper portion of the scenario 400 includes the display device 112 and the user 202 viewing the display device 112. Further, the user 202 is engaged in the communication session 210 with the user 208, introduced above.

In the upper portion of the scenario 400, the client device 102 detects the gaze direction 306 which indicates that the user 208 is invoking the shared interactive space 216 within the communications GUI 204, such as discussed above.

Proceeding to the lower portion of the scenario 400, the user shifts their gaze toward the sub-window 212 and the client device 102 detects a change from the gaze direction 306 to a gaze direction 402. The change in gaze direction, for instance, is detected based on video images of the user 202 captured by the camera 122. In response to the change to the gaze direction 402, the user image 206 replaces the shared interactive space 216 in the communications GUI 204. Further, the user image 214 replaces the user image 220 in the sub-window 212. The gaze direction 402, for instance, is interpreted as a command to display the user image 206 in the communications GUI 204, e.g., in place of the shared interactive space 216. For example, the change to the gaze direction 402 indicates an intent by the user 202 to interact directly with the user image 206.

Figure 5:
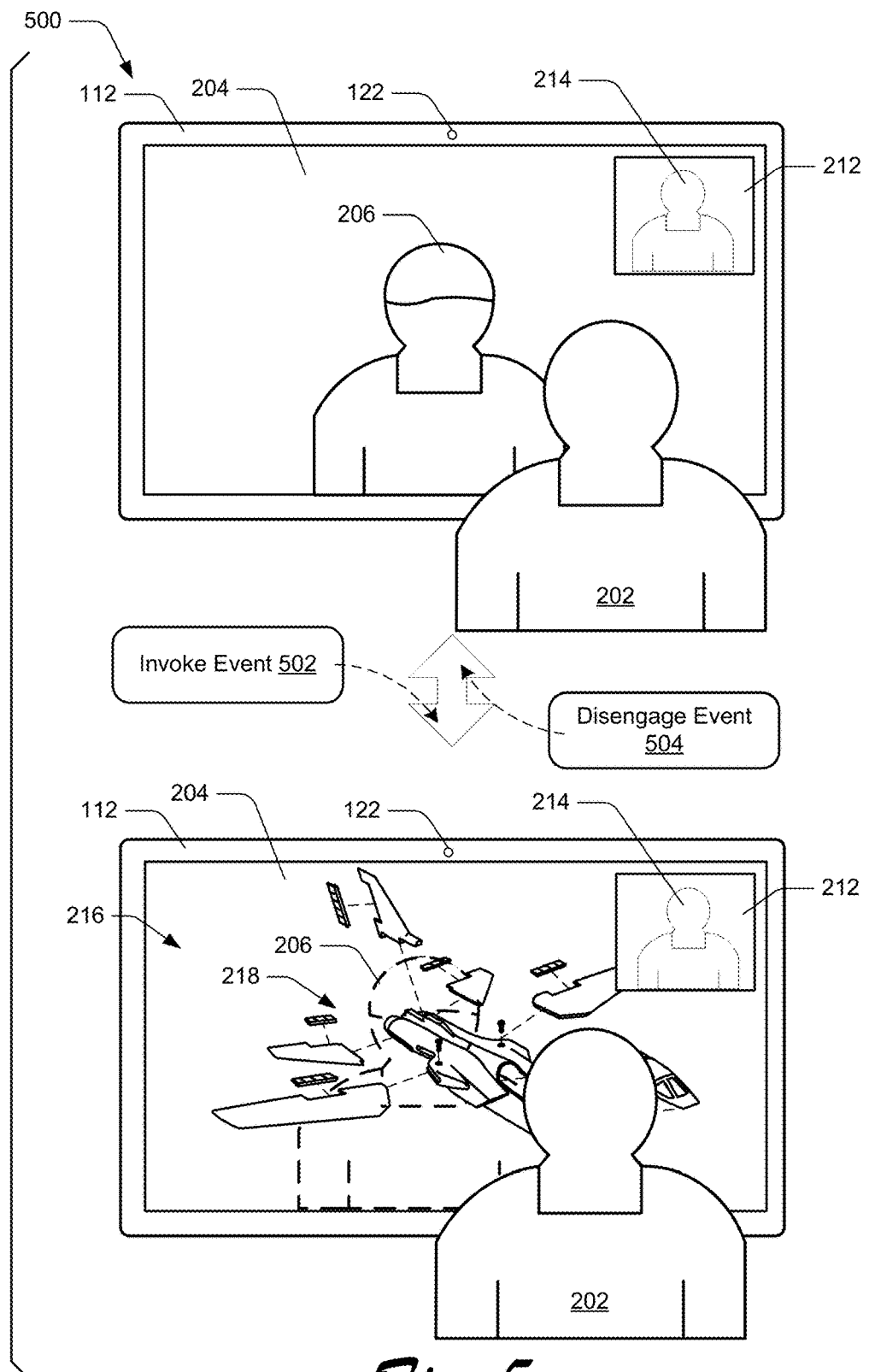
FIG. 5 depicts an example implementation scenario for an interactive ink mode in accordance with one or more embodiments.

FIG. 5 depicts an example implementation scenario 500 for an interactive ink mode in accordance with one or more implementations. In at least some implementations, the scenario 500 represents a continuation and/or variation of the scenarios 200-400. The upper portion of the scenario 500 includes the display device 112 and the user 202 viewing the display device 112. Further, the user 202 is engaged in a communication session with the user 208 and the user image 206 is displayed within the communications GUI 204.

Proceeding to the lower portion of the scenario 500, an invoke event 502 occurs that is interpreted by the client device 102 as an intent to invoke the shared interactive space 216. Examples of different invoke events are detailed elsewhere herein, and include bringing a pen in proximity to the display device 112, changing a gaze direction, and so forth.

In response to the invoke event 502, the shared interactive space 216 is presented within the communications GUI 204. Further, notice that the user image 206 is not removed from the communications GUI 204, but is visually deemphasized within the communications GUI 204. For instance, the interactive object 218 is overlaid over the user image 206, and/or the user image 206 is visually faded within the communications GUI 204. Thus, the user 202 may continue to view the user image 206 while viewing and interacting with the shared interactive space 216.

Notice that the user image 214 continues to be displayed in the sub-window 212, even after the shared interactive space 216 is invoked.

Further to the scenario 500, if the user initiates a disengage event 504, the scenario returns to the upper portion where the user image 206 is given focus within the communications GUI 204. The disengage event 504, for instance, is interpreted as a command to give the user image 206 focus and/or to deemphasize the shared interactive space 216. Examples of the disengage event 504 are discussed above, and generally include removing the pen 128 from proximity to the display device 112, changing a user gaze direction, and so forth.

Thus, the scenarios 300-500 illustrate that techniques discussed herein may be employed to utilize various types of input to cause a shared interactive space to be presented and removed.

Figure 6:
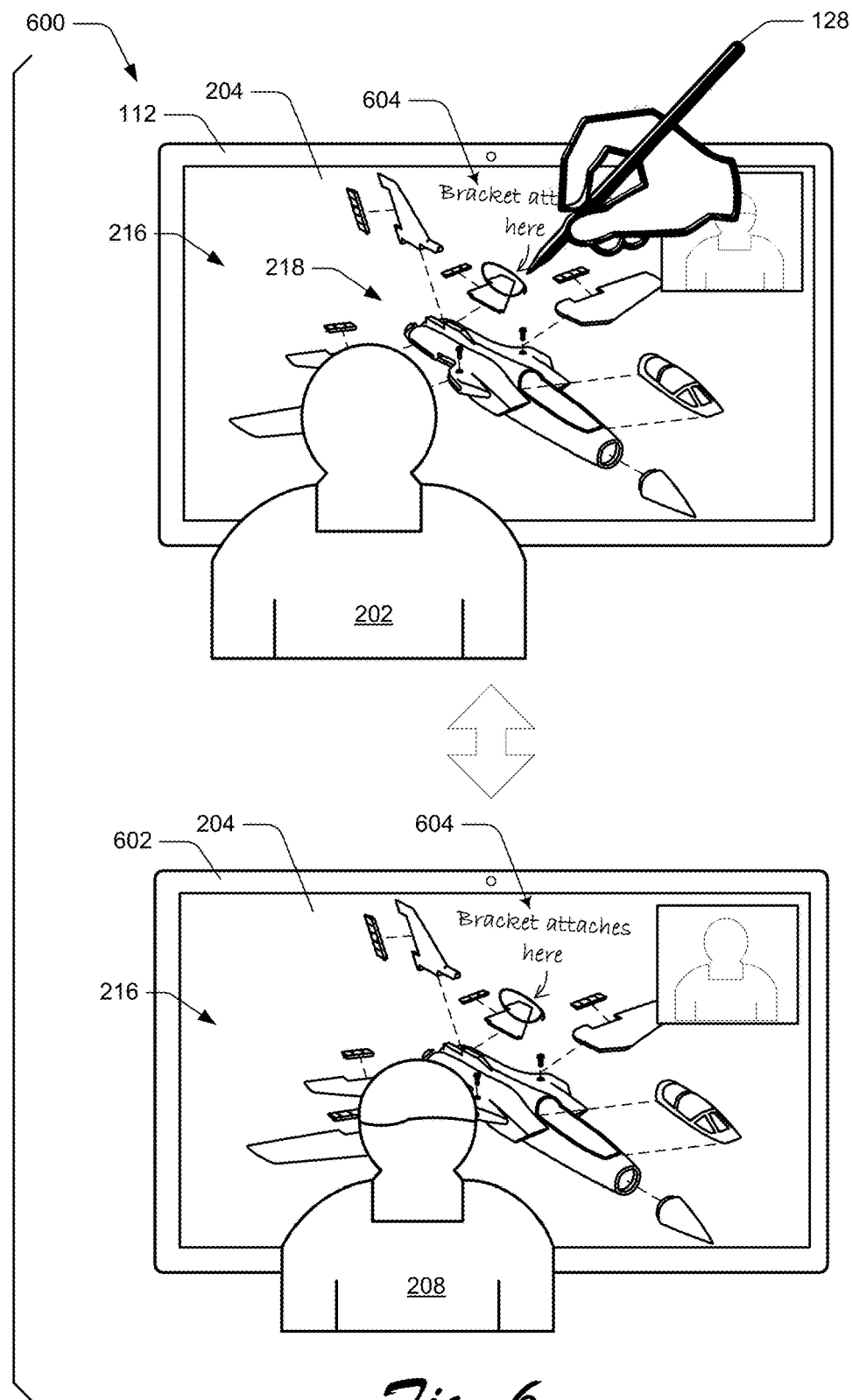
FIG. 6 depicts an example implementation scenario for an interactive ink mode in accordance with one or more embodiments.

FIG. 6 depicts an example implementation scenario 600 for an interactive ink mode in accordance with one or more implementations. In at least some implementations, the scenario 600 represents a continuation and/or variation of one or more of the scenarios 200-500. Generally, the scenario 600 occurs while the users 202, 208 are engaged in a communication session.

The upper portion of the scenario 600 includes the display device 112 and the user 202 viewing the display device 112. The lower portion of the scenario 500 includes a display 602 with the user 208 viewing the display 602. The display 602, for instance, represents a display device of the user device 132. Both of the displays 112, 602 are displaying the communications GUI 204 with the shared interactive space 216.

In the upper portion of the scenario 600, the user 202 applies ink content 604 to the interactive object 218 using the pen 128. The ink content 604, for instance, includes an annotation of the interactive object 218. As the user 202 applies the ink content 604 to the display device 112, the ink content 604 is presented within the display 602 such that the user 208 views the ink content 604 as it is applied. For instance, the ink content 604 is presented in the display 602 in real-time as the user 202 applies the ink content 604 in the display device 112. Thus, interaction by the user 202 with the shared interactive space 216 is presented within the display 602 for viewing by the user 208, e.g., in real-time.

Figure 7:
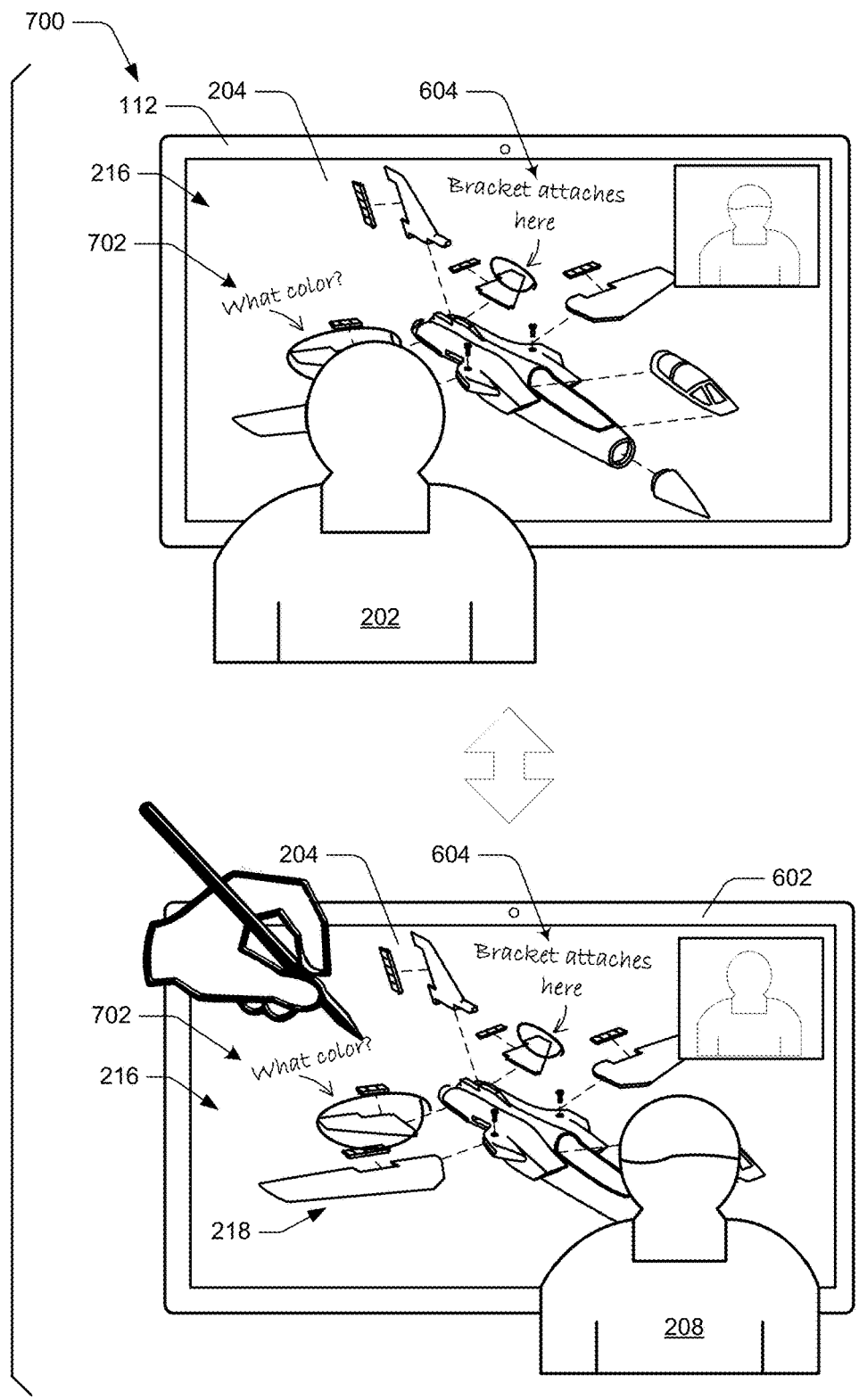
FIG. 7 depicts an example implementation scenario for an interactive ink mode in accordance with one or more embodiments.

FIG. 7 depicts an example implementation scenario 700 for an interactive ink mode in accordance with one or more implementations. In at least some implementations, the scenario 700 represents a continuation and/or variation of one or more of the scenarios 200-600. Generally, the scenario 700 occurs while the users 202, 208 are engaged in a communication session.

The upper portion of the scenario 700 includes the display device 112 and the user 202 viewing the display device 112. The lower portion of the scenario 500 includes the display 602 with the user 208 viewing the display 602. Both of the displays 112, 602 are displaying the communications GUI 204 with the shared interactive space 216.

Further to the scenario 700, the user 208 applies ink content 702 to the interactive object 218. The ink content 702, for instance, represents an annotation presented within the shared interactive space 216. As the user 208 applies the ink content 702 to the display 502, the ink content 702 is presented within the display device 112 such that the user 202 views the ink content 702 as it is applied, e.g., in real-time.

Notice that the ink content 604 persists in the shared interactive space 216. In at least some implementations, ink content that is applied in a shared interactive space is applied as permanent ink that becomes part of a document created using the shared interactive space. Alternatively or additionally, ink content applied to a shared interactive space is saved as part of a transient layer that is bound to primary content of a shared interactive space (e.g., to the interactive object 218) but that is saved as a separately accessible layer.

Thus, the scenarios 600, 700 illustrate that different users at different locations can apply ink within a shared interactive space during a communication session, and that ink applied within a shared interactive space is viewable by users (e.g., all users) participating in the communication session.

Figure 8:
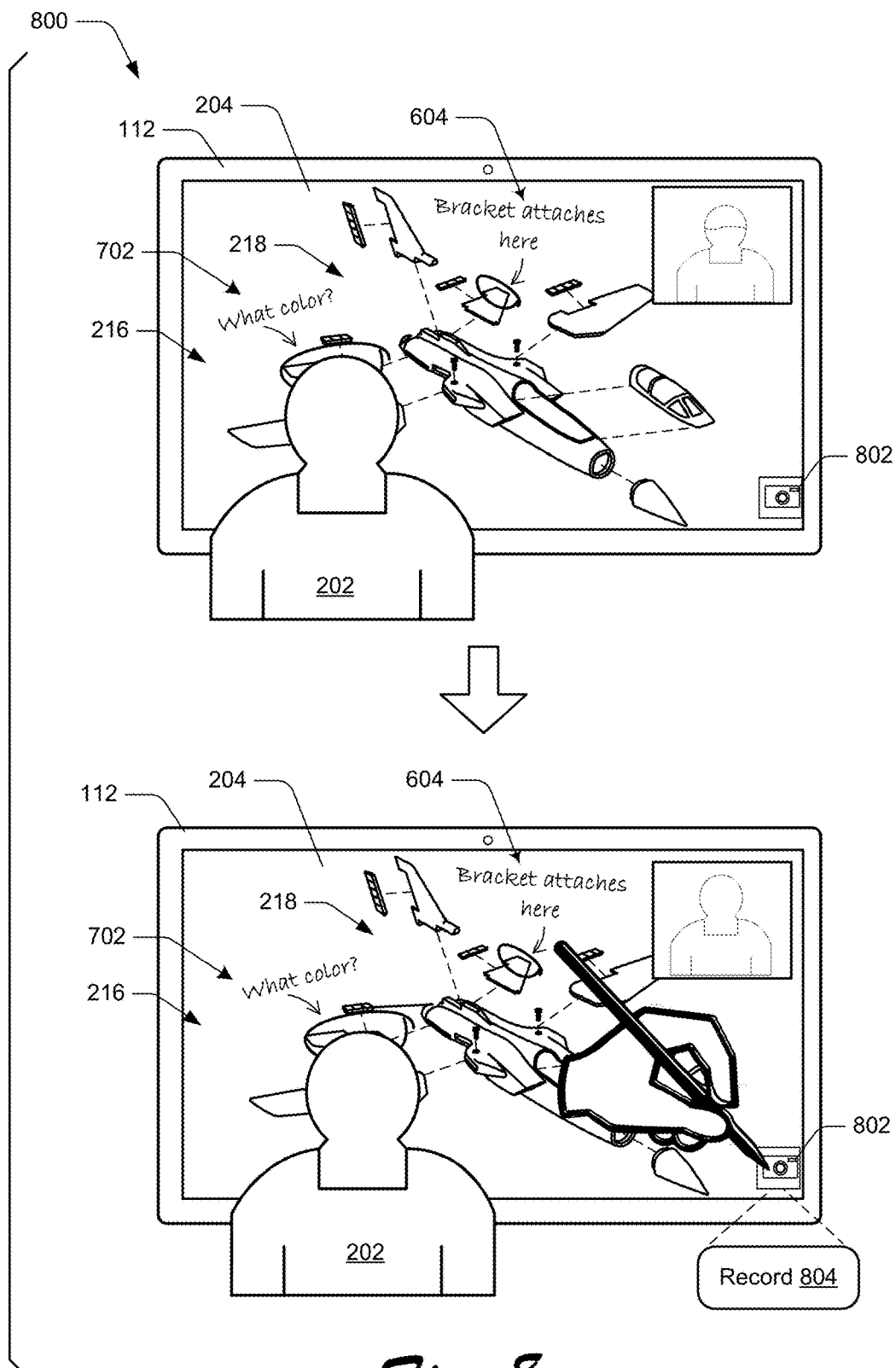
FIG. 8 depicts an example implementation scenario for capturing a portion of a shared interactive space in accordance with one or more embodiments.

FIG. 8 depicts an example implementation scenario 800 for capturing a portion of a shared interactive space in accordance with one or more implementations. In at least some implementations, the scenario 800 represents a continuation and/or variation of one or more of the scenarios 200-700. Generally, the scenario 800 occurs while the users 202, 208 are engaged in the communication session 210.

The upper portion of the scenario 800 includes the display device 112 and the user 202 viewing the display device 112. Presented on the display device 112 is the communications GUI 204 including the shared interactive space 216 and the interactive object 218 with ink content 604, 702. Displayed within the communications GUI 204 is a capture control 802, which is representative of functionality for capturing a portion of the shared interactive space 216.

Proceeding to the lower portion of the scenario 800, the user 202 selects the capture control 802 which causes a record 804 of the shared interactive space 216 to be captured and stored. Generally, the record 804 represents a digital copy of the shared interactive space 216. For instance, the record 804 represents a snapshot (e.g., a still image) of the shared interactive space as it appears when the capture control 802 is selected. For instance, the record 804 includes the interactive object 218 and the ink content 604, 702.

Alternatively or additionally, the record 804 represents a recording of the shared interactive space 216 over a period of time, such as while the communication session 210 is in progress. For instance, selection of the capture control 802 initiates a record operation that records interactions with the shared interactive space 216. Thus, in at least some implementations, the record 804 stores a video representation of the shared interactive space 216 that can be played back to recreate interactions with the shared interactive space 216, such as ink content that is applied within the shared interactive space 216.

In at least some implementations, the record 804 is stored as part of a transient ink layer that is bound to a primary content layer of the shared interactive space 216. Alternatively or additionally, the record 804 is included as part of a permanent ink layer of the shared interactive space 216.

According to various implementations, the record 804 may be accessed at a later time (e.g., after the communication session 210 is terminated) to view interactions that occurred with the shared interactive space 216, such as snapshots, videos, animations, and so forth.

While the implementation scenario 800 is discussed with reference to recording the shared interactive space 216 in response to a selection of the capture control 802, in at least some implementations a recording of the shared interactive space 216 is automatically captured an independent of user input to capture the shared interactive space 216. For instance, when a communication session is initiated, a capture process for capturing the shared interactive space 216 is automatically initiated. Further, a record of the shared interactive space 216 can be propagated to a transient ink layer for the shared interactive space 216.

While the implementation scenarios discussed above are described with reference to presenting a shared interactive space on a same display with the communications GUI 204, it is to be appreciated that in at least some implementations a shared interactive space may be presented on a separate input surface. For instance, the communications GUI 204 may be displayed on a particular display device and shared interactive space may be displayed on a separate display device, such as a tablet and/or other computing device that is in proximity to the particular display device.

Figure 9:
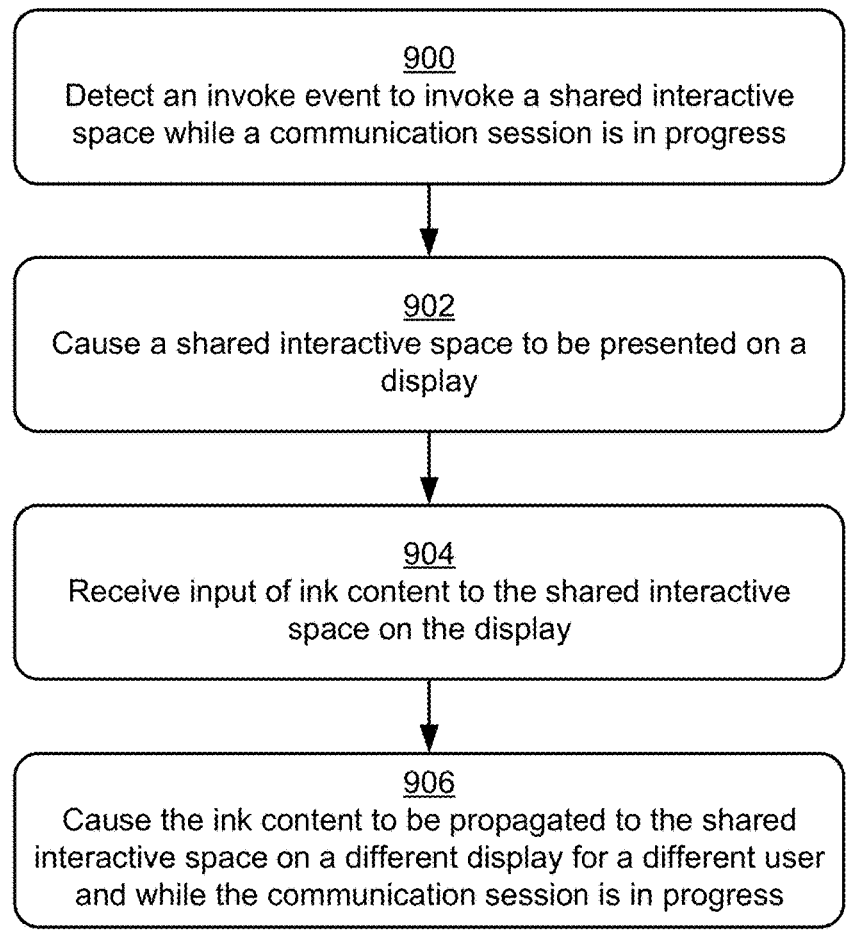
FIG. 9 is a flow diagram that describes steps in a method for presenting a shared interactive space in accordance with one or more embodiments.

FIG. 9 is a flow diagram that describes steps in a method in accordance with one or more implementations. The method, for instance, describes an example procedure for presenting a shared interactive space in accordance with one or more implementations.

Step 900 detects an invoke event to invoke a shared interactive space while a communication session is in progress. Various types of invoke events can be detected to invoke a shared interactive space. For instance, an invoke event may include detecting a pen in proximity to an input surface. The client device 102, for instance, detects that the pen 128 is hovered and/or in contact with the display device 112. As referenced above, a hover operation can be associated with a particular threshold proximity to an input surface such that hovering the pen 128 at or within the threshold proximity to the input surface is interpreted as a hover operation, but placing the pen 128 farther than the threshold proximity from the input surface is not interpreted as a hover operation.

Another example of an invoke event is a change in detected user gaze direction. For instance, a user participating in the communication session may redirect their gaze from a portion of a display to a different portion of the display. In at least some implementations, this change in gaze direction is interpreted as a command to present a shared interactive space. It is to be appreciated, however, that a variety of other invoke events may be employed in accordance with the claimed implementations.

Step 902 causes a shared interactive space to be presented on a display. The shared interactive surface, for example, is presented on displays for different users that are participating in the communication session.

Step 904 receives input of ink content to the shared interactive space on the display. The ink module 116, for instance, detects ink content applied via the pen 128 to the shared interactive space.

Step 906 causes the ink content to be propagated to the shared interactive space on a different display for a different user and while the communication session is in progress. The different display, for instance, represents a display for a different user that is participating in the communication session. In at least some implementations, the ink content is propagated to the shared interactive space on the different display in real-time as it is applied.

While implementations are discussed herein with reference to interactions between two users and two instances of a shared interactive space, it is to be appreciated that implementations for ink for a shared interactive space discussed herein can be employed for many users at many different locations to facilitate sharing of ink content.

Figure 10:
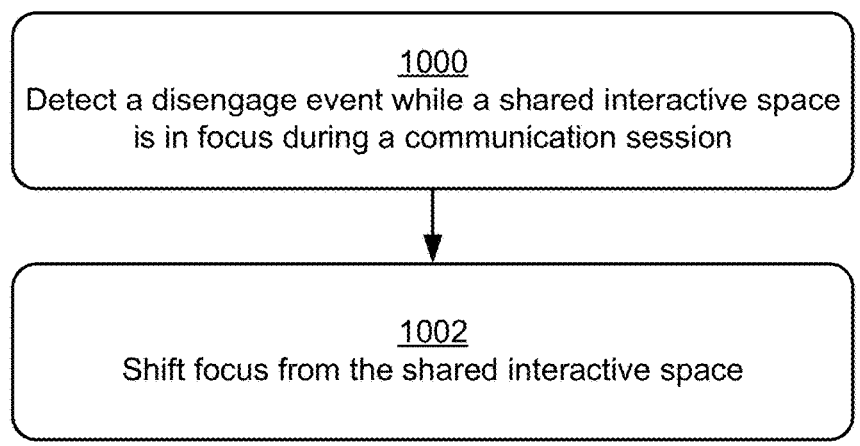
FIG. 10 is a flow diagram that describes steps in a method for shifting focus from a shared interactive space in accordance with one or more embodiments.

FIG. 10 is a flow diagram that describes steps in a method in accordance with one or more implementations. The method, for instance, describes an example procedure for shifting focus from a shared interactive space in accordance with one or more implementations.

Step 1000 detects a disengage event while a shared interactive space is in focus during a communication session. Generally, a disengage event is interpreted as a command to shift focus from a shared interactive space. For instance, a disengage event indicates a user intent to shift focus from interacting with a shared interactive space, to interacting with another user as part of the communication session. Examples of a disengage event include detecting that a pen is removed from proximity to a display surface, detecting a change in a user gaze direction, and so forth.

Step 1002 shifts focus from the shared interactive space. For instance, focus is shifted from the shared interactive space to an image of a user that is participating in the communication session. According to one or more implementations, shifting focus from the shared interactive space includes causing the shared interactive space to be removed from a display and/or visually deemphasized. For instance, with reference to the communications GUI 204, the shared interactive space 216 is removed from the GUI. Alternatively, the shared interactive space 216 is reduced in size, is overlaid with a user image, is moved to the sub-window 212, and so forth.

Figure 11:
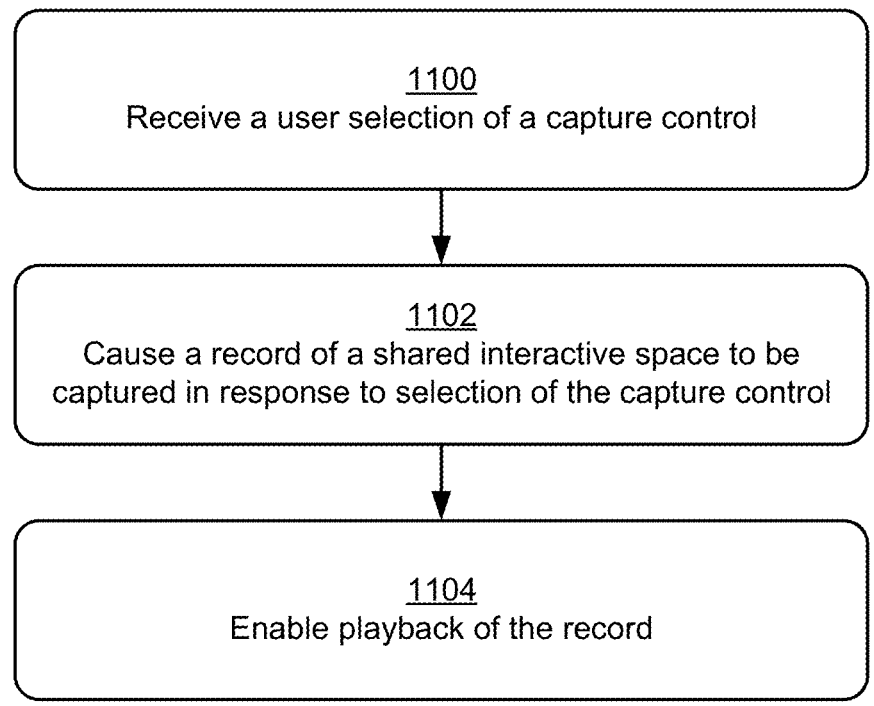
FIG. 11 is a flow diagram that describes steps in a method for capturing a record of interaction with a shared interactive space in accordance with one or more embodiments.

FIG. 11 is a flow diagram that describes steps in a method in accordance with one or more implementations. The method, for instance, describes an example procedure for capturing a record of interaction with a shared interactive space in accordance with one or more implementations.

Step 1100 receives a user selection of a capture control. For instance, the capture control is selected while a shared interactive space is in focus during a communication session.

Step 1102 causes a record of a shared interactive space to be captured in response to selection of the capture control. For instance, a snapshot of the shared interactive space is captured and stored. Alternatively or additionally, a video representation of the shared interactive space is captured and stored, such as a representation of a state of the shared interactive space as it occurred during a communication session.

As yet another implementation, the record can include ink content that is extracted from the shared interactive space and saved as a separate document. For instance, the document can include ink content applied to the shared interactive space but that is saved separately from a record of the shared interactive space itself, such as separately from a snapshot and/or video record of the shared interactive space.

Step 1104 enables playback of the record. For instance, a snapshot of the shared interactive space can be viewed at a later time, such as after a communication session is terminated. Alternatively or additionally, a video record of interactions with the shared interactive space can be played back, such as to present playback of ink content that was applied to the shared interactive space during a communication session. As yet another implementations, a file that includes ink content extracted from the shared interactive space can be retrieved and viewed. The file, for instance, represents a file (e.g., a text document) that is generated by performing optical character recognition on ink content to generate encoded characters, which are then populated to the file.

The next portion of this discussion presents an example implementation scenario and procedure for using ink for emphasis during a communication session in accordance with various implementations. Generally, ink for emphasis provides ways of using ink for temporary purposes, such as for identifying content, highlighting content, for temporary communication, and so forth.

Figure 12:
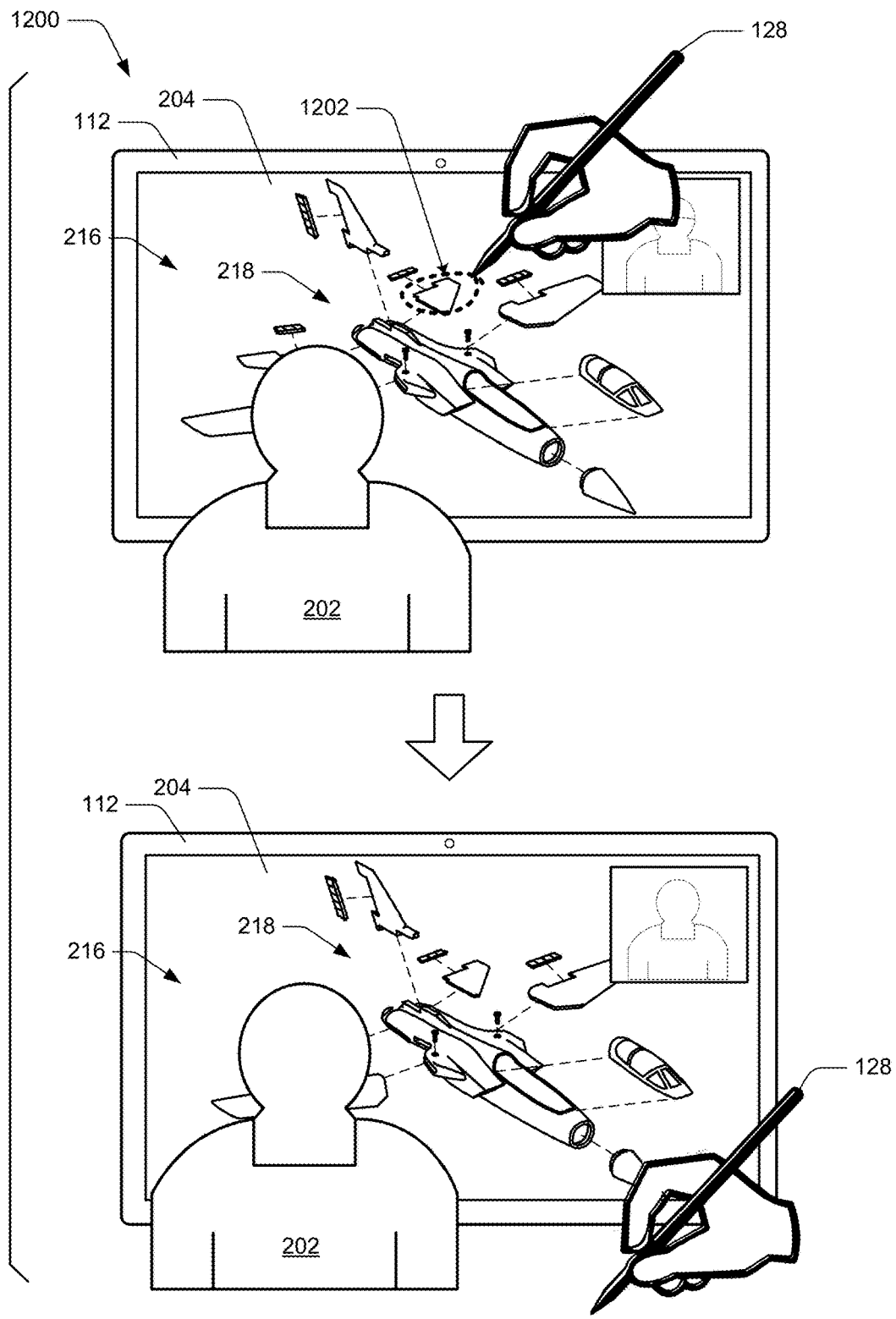
FIG. 12 depicts an example implementation scenario for ink for emphasis in accordance with one or more embodiments.

FIG. 12 depicts an example implementation scenario 1200 for ink for emphasis in accordance with one or more implementations. The scenario 1200, for example, represents a continuation and/or variation of the scenarios described above.

The upper portion of the scenario 1200 includes the display device 112 and the user 202 viewing the display device 112. Displayed on the display device 112 is the communications GUI 204 with the shared interactive space 216 and the interactive object 218. According to various implementations, the shared interactive space 216 is in an emphasis ink mode such that ink applied to the shared interactive space 216 is temporary, e.g., is not stored as part of a permanent or transient ink layer.

Further to the scenario 1200, the user 202 applies emphasis ink 1202 to identify and/or emphasize a portion of the interactive object 218.

Proceeding to the lower portion of the scenario 1200, the user removes the pen 128 from proximity to the display device 112. In response to detecting that the pen 128 is removed from proximity to the display device 112, the emphasis ink 1202 fades and disappears from the communications GUI 204. For instance, as long as the pen 128 is detected in proximity to the display device 112, the emphasis ink 1202 remains displayed. However, when the pen 128 is detected as being removed from proximity to the display device 112, a first timer begins running while the emphasis ink 1202 is displayed. When the first timer expires, a second timer begins running during which the emphasis ink 1202 fades from the communications GUI 204. When the second timer expires, the emphasis ink 1202 disappears, e.g., is removed from display. The emphasis ink 1202, for example, is not saved as part of a record of the shared interactive space 216. Thus, the emphasis ink 1202 may be used for various purposes, such as to identify and/or emphasize content during a communication session (e.g., a meeting or other communication interaction), as part of a temporary communication (e.g., during an online meeting), and so forth.

Figure 13:
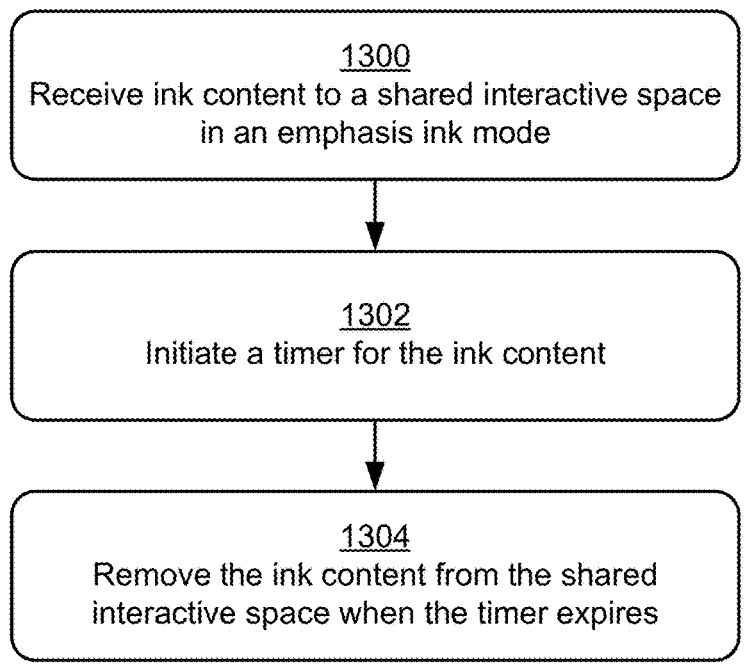
FIG. 13 is a flow diagram that describes steps in a method for ink for emphasis in accordance with one or more embodiments.

FIG. 13 is a flow diagram that describes steps in a method in accordance with one or more implementations. The method, for instance, describes an example procedure for ink for emphasis in accordance with one or more implementations. In at least some implementations, the method represents an extension of the methods described above.

Step 1300 receives ink content to a shared interactive space in an emphasis ink mode. The ink module 116, for example, detects that a user applies ink content while an emphasis ink mode is active. According to various implementations, an emphasis mode is activatable by a user, such as in response to selection of an emphasis control included as part of the communications GUI 204.

Step 1302 initiates a timer for the ink content. For instance, one or more timers are initiated while the ink content is displayed. The timers, for example, are specific to the emphasis ink mode. In at least some implementations, the timer is initiated in response to detecting that the pen 128 is removed from proximity to the display device 112 and/or that a user has changed their gaze direction, such as after a user applies the ink content using the pen 128.

Step 1304 removes the ink content from the shared interactive space when the timer expires. The ink content, for instance, fades and is automatically removed from display in response to expiry of one or more timers and independent of user input to remove the ink content.

Having described some example implementation scenarios and procedures for ink for a shared interactive space, consider now a discussion of an example system and device in accordance with one or more implementations.

Example System and Device

Figure 14:
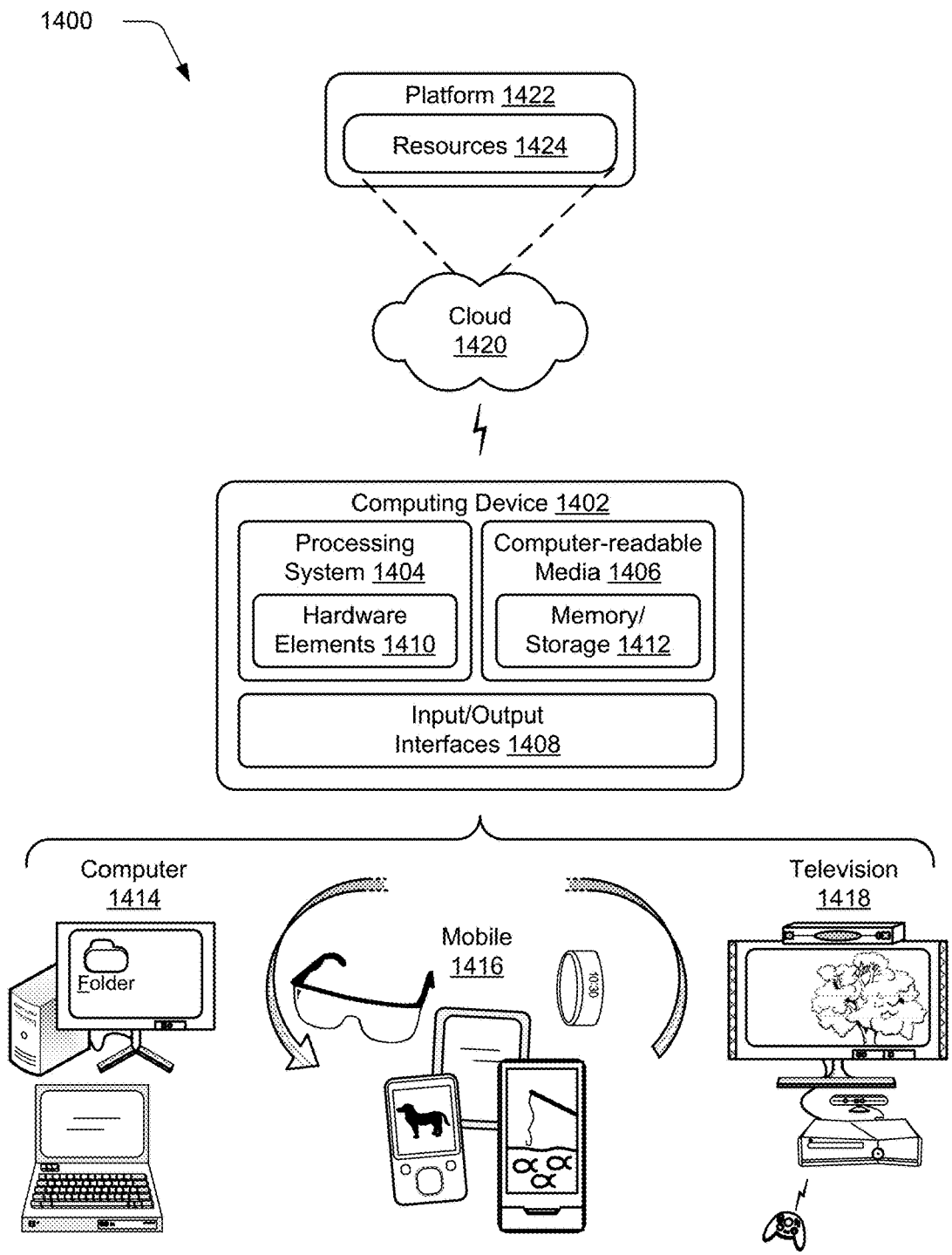
FIG. 14 illustrates an example system and computing device as described with reference to FIG. 1, which are configured to implement embodiments of techniques described herein.

FIG. 14 illustrates an example system generally at 1400 that includes an example computing device 1402 that is representative of one or more computing systems and/or devices that may implement various techniques described herein. For example, the client device 102 discussed above with reference to FIG. 1 can be embodied as the computing device 1402. The computing device 1402 may be, for example, a server of a service provider, a device associated with the client (e.g., a client device), an on-chip system, and/or any other suitable computing device or computing system.

The example computing device 1402 as illustrated includes a processing system 1404, one or more computer-readable media 1406, and one or more Input/Output (I/O) Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1410 and computer-readable media 1406 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules that are executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1414, mobile 1416, and television 1418 uses. Each of these configurations includes devices that may have generally different constructs and capabilities, and thus the computing device 1402 may be configured according to one or more of the different device classes. For instance, the computing device 1402 may be implemented as the computer 1414 class of a device that includes a personal computer, desktop computer, a multi-screen computer, laptop computer, netbook, and so on.

The computing device 1402 may also be implemented as the mobile 1416 class of device that includes mobile devices, such as a mobile phone, portable music player, portable gaming device, a tablet computer, a wearable device, a multi-screen computer, and so on. The computing device 1402 may also be implemented as the television 1418 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. For example, functionalities discussed with reference to the client device 102 and/or the user device 132 may be implemented all or in part through use of a distributed system, such as over a "cloud" 1420 via a platform 1422 as described below.

The cloud 1420 includes and/or is representative of a platform 1422 for resources 1424. The platform 1422 abstracts underlying functionality of hardware (e.g., servers) and software resources of the cloud 1420. The resources 1424 may include applications and/or data that can be utilized while computer processing is executed on servers that are remote from the computing device 1402. Resources 1424 can also include services provided over the Internet and/or through a subscriber network, such as a cellular or Wi-Fi network.

The platform 1422 may abstract resources and functions to connect the computing device 1402 with other computing devices. The platform 1422 may also serve to abstract scaling of resources to provide a corresponding level of scale to encountered demand for the resources 1424 that are implemented via the platform 1422. Accordingly, in an interconnected device implementation, implementation of functionality described herein may be distributed throughout the system 1400. For example, the functionality may be implemented in part on the computing device 1402 as well as via the platform 1422 that abstracts the functionality of the cloud 1420.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for causing a shared interactive space to be presented while a communication session is in progress, the system including: one or more processors; and one or more computer-readable storage media storing computer-executable instructions that, responsive to execution by the one or more processors, cause the system to perform operations including: detecting an invoke event to invoke a shared interactive space while a communication session between a first user and a second user is in progress, the invoke event including at least one of a user gaze direction or a pen in proximity to an input surface; causing a shared interactive space to be presented on a first display associated with the first user, and a second display associated with the second user, and in response to detecting the invoke event; receiving input of ink content to the shared interactive space on the first display; and causing the ink content to be propagated to the shared interactive space on the second display and while the communication session is in progress.

Example 2

A system as described in example 1, wherein the invoke event includes the pen in proximity to the first display.

Example 3

A system as described in one or more of examples 1 or 2, wherein the invoke event includes the pen in proximity to the first display and independent of contact of the pen with the first display.

Example 4

A system as described in one or more of examples 1-3, wherein the invoke event includes detecting a change in the user gaze direction.

Example 5

A system as described in one or more of examples 1-4, wherein said causing the shared interactive space to be presented includes causing an image of the second user displayed on the first display to be replaced or overlaid with the shared interactive space.

Example 6

A system as described in one or more of examples 1-5, wherein said causing the shared interactive space to be presented includes causing an image of the second user displayed on the first display to be replaced or overlaid with the shared interactive space, and wherein the operations further include causing the image of the second user to be populated to a sub-window of a communications graphical user interface displayed on the first display.

Example 7

A system as described in one or more of examples 1-6, wherein the operations further include: detecting a disengage event while the communication session is in progress including detecting one or more of the pen being removed from proximity to the display surface or a change in the user gaze direction; and shifting focus from the shared interactive space by causing the shared interactive space to be removed from display or visually deemphasized on one or more of the first display or the second display.

Example 8

A system as described in one or more of examples 1-7, wherein the operations further include: receiving a user selection of a capture control; and causing a record of the shared interactive space including the ink content to be captured in response to selection of the capture control.

Example 9

A system as described in one or more of examples 1-8, wherein the operations further include: capturing a real-time recording of ink content applied by one or more of the first user or the second user to the shared interactive space; and enabling playback of the recording.

Example 10

A system as described in one or more of examples 1-9, wherein said causing the ink content to be propagated to the shared interactive space on the second display includes causing the ink content to be displayed in real-time on the second display as the ink content is applied to the shared interactive space on the first display.

Example 11

A computer-implemented method for causing a shared interactive space to be presented while a communication session is in progress, the method including: detecting by a computing device a change in gaze direction of a first user while a communication session between the first user and a second user is in progress; causing a shared interactive space to be presented on a first display associated with the first user, and a second display associated with the second user, and in response to detecting the change in gaze direction; receiving input of ink content to the shared interactive space on the first display; and causing the ink content to be propagated to the shared interactive space on the second display and while the communication session is in progress.

Example 12

A computer-implemented method as described in example 11, wherein said detecting includes detecting that the gaze direction changes toward a pre-specified region of the first display that is associated with invoking the shared interactive space.

Example 13

A computer-implemented method as described in one or more of examples 11 or 12, wherein said causing a shared interactive space to be presented includes one of: causing an image of the second user displayed on the first display to be replaced with the shared interactive space; or causing the shared interactive space to be overlaid over the image of second user displayed on the first display such that the image of the second user is at least partially visible on the first display.

Example 14

A computer-implemented method as described in one or more of examples 11-13, further including causing the ink content to fade and disappear from the shared interactive space after a particular time interval elapses.

Example 15

A computer-implemented method as described in one or more of examples 11-14, further including causing the ink content to be saved to a document separate from a snapshot of the shared interactive space.

Example 16

A computer-implemented method as described in one or more of examples 11-15, further including: detecting a further change in gaze direction of the first user while the communication session is in progress; and shifting focus on the first display from the shared interactive space to an image of the second user in response to the further change in gaze direction.

Example 17

A computer-implemented method for causing a shared interactive space to be presented while a communication session is in progress, the method including: detecting by a computing device a pen in proximity to a display surface of a first display associated with a first user and while a communication session between the first user and a second user is in progress; causing by the computing device a shared interactive space to be presented on the first display and a second display associated with the second user, and in response to detecting the pen in proximity to the display surface; receiving input of ink content to the shared interactive space on the first display; and causing the ink content to be propagated to the shared interactive space on the second display and while the communication session is in progress.

Example 18

A computer-implemented method as described in example 17, wherein said detecting includes detecting that the pen is hovered over the display surface.

Example 19

A computer-implemented method as described in one or more of examples 17 or 18, wherein said causing the shared interactive space to be presented is not limited to detecting the pen in proximity to a specific region of the display surface.

Example 20

A computer-implemented method as described in one or more of examples 17-19, further including: detecting that the pen is removed from proximity to the display surface; and causing on one or more of the first display or the second display the shared interactive space to be removed from display or visually deemphasized.

Conclusion

Techniques for ink for a shared interactive space are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
one or more processors; and
one or more computer-readable storage media storing computer-executable instructions that, responsive to execution by the one or more processors, cause the system to perform operations including:
displaying, in a communication client user interface and on a first display associated with a first user device, a video communication session that is in progress between the first user device and a second user device, the video communication session presenting, in the communication client user interface, a live video image received from the second user device;
detecting an invoke event to invoke a shared interactive space that includes a digital canvas to receive ink content input at the system, the invoke event including at least one of a user gaze direction or a pen in proximity to an input surface of the system;
modifying, in response to detecting the invoke event, the communication client user interface on the first display to include a first instance of the shared interactive space such that the live video image received from the second user device is deemphasized within the communication client interface and overlaid on the first instance of the shared interactive space;
receiving input of ink content to the digital canvas of the first instance of the shared interactive space;
causing the ink content input to the digital canvas of the first instance to be propagated to a second instance of the shared interactive space at the second user device while the video communication session is in progress;
detecting a disengage event while the communication session is in progress including detecting one or more of the pen being removed from proximity to the input surface or a change in the user gaze direction; and
shifting focus from the shared interactive space by causing one or more of the first instance of the shared interactive space or the second instance of the shared interactive space to be removed from display or visually deemphasized on one or more of the first display or a second display of the second user device.

2. The system as described in claim 1, wherein the invoke event comprises the pen in proximity to the first display.

3. The system as described in claim 1, wherein the invoke event comprises the pen in proximity to the first display and independent of contact of the pen with the first display.

4. The system as described in claim 1, wherein the invoke event comprises the detecting the change in the user gaze direction.

5. The system as described in claim 1, wherein the operations further include:
receiving a user selection of a capture control; and
causing a record of the first instance of the shared interactive space including the ink content input to be captured in response to selection of the capture control.

6. The system as described in claim 1, wherein the operations further include:
capturing a real-time recording of ink content applied to one or more of the first instance of the shared interactive space or the second instance of the shared interactive space; and
enabling playback of the recording.

7. The system as described in claim 1, wherein said causing the ink content input to the digital canvas of the first instance to be propagated to the second instance of the shared interactive space comprises causing the ink content input to be displayed in real-time on the second display as the ink content input is applied to the digital canvas of the first instance.

8. The system as described in claim 1, wherein the disengage event comprises detecting that the pen is removed from proximity to the input surface.

9. A computer-implemented method, comprising:
displaying, in a communication client user interface and on a first display associated with a first user device, a video communication session that is in progress between the first user device and a second user device, the video communication session presenting, in the communication client user interface, a live video image received from the second user device;
detecting by a computing device a first change in gaze direction of a user while the video communication session is in progress;
modifying, in response to detecting the first change in the gaze direction, the communication client user interface on the first display to include a first instance of a shared interactive space such that the live video image received from the second user device is deemphasized within the communication client interface and overlaid on the first instance of the shared interactive space;
receiving input of ink content to a digital canvas of the first instance of the shared interactive space;
causing the ink content input to the digital canvas of the first instance to be propagated to a second instance of the shared interactive space at the second user device while the video communication session is in progress;
detecting a disengage event while the communication session is in progress including detecting a second change in the gaze direction of the user; and
shifting focus from the shared interactive space by causing one or more of the first instance of the shared interactive space or the second instance of the shared interactive space to be removed from display or visually deemphasized on one or more of the first display or a second display of the second user device.

10. A computer-implemented method as recited in claim 9, wherein said detecting the first change in the gaze direction comprises detecting that the first change in the gaze direction changes toward a pre-specified region of the first display that is associated with invoking the first instance of the shared interactive space.

11. A computer-implemented method as recited in claim 9, further comprising causing the ink content input to fade and disappear from the first instance of the shared interactive space after a particular time interval elapses.

12. A computer-implemented method as recited in claim 9, further comprising causing the ink content input to be saved to a document separate from a snapshot of the first instance of the shared interactive space.

13. A computer-implemented method as recited in claim 9, further comprising deemphasizing the live video image received from the second user device by presenting the live video image received from the second user device in a sub-window of the communication client interface.

14. A computer-implemented method as recited in claim 9, wherein said detecting the first change in the gaze direction of the user comprises analyzing video captured by a camera associated with the first user device.

15. A computer-implemented method, comprising:
displaying, in a communication client user interface and on a first display associated with a first user device, a video communication session that is in progress between the first user device and a second user device, the video communication session presenting, in the communication client user interface, a live video image received from the second user device;
detecting, by a computing device, a pen in proximity to a display surface of the first display and while the video communication session is in progress;
modifying, in response to detecting the pen in proximity to the display surface of the first display and by the computing device, the communication client interface on the first display to include a first instance of a shared interactive space such that the live video image received from the second device is deemphasized within the communication client interface;
receiving input of ink content to the first instance of the shared interactive space on the first display;
causing the ink content input to be propagated to a second instance of the shared interactive space at the second user device and while the video communication session is in progress;
detecting a disengage event while the communication session is in progress including detecting the pen being removed from proximity to the display surface; and
shifting focus from the shared interactive space by causing one or more of the first instance of the shared interactive space or the second instance of the shared interactive space to be removed from display or visually deemphasized on one or more of the first display or a second display of the second user device.

16. A computer-implemented method as recited in claim 15, wherein said detecting the pen in proximity to the display surface comprises detecting that the pen is hovered over the display surface.

17. A computer-implemented method as recited in claim 15, wherein said modifying the communication client user interface to include the first instance of the shared interactive space in response to detecting the pen in proximity to the display surface is not limited to detecting the pen in proximity to a specific region of the display surface.

18. A computer-implemented method as recited in claim 15, further comprising saving the ink content input to a transient layer that is separately accessible from a primary content layer associated with content included in the first instance of the shared interactive space.

19. A computer-implemented method as recited in claim 15, further comprising deemphasizing the live video image received from the second user device by presenting the live video image received from the second user device in a sub-window of the first display.

20. A computer-implemented method as recited in claim 15, wherein said receiving input of ink content further comprises:
processing ink content input entered in the shared interactive space according to an active ink mode, the active ink mode comprising one of: a permanent ink mode, a transient ink mode, or an emphasis ink mode.

\* \* \* \* \*